(12) United States Patent
Arakawa et al.

(10) Patent No.: US 7,202,298 B2
(45) Date of Patent: Apr. 10, 2007

(54) POLYAMIDE RESIN COMPOSITION FOR PART OF ENGINE COOLING WATER SYSTEM AND PART COMPRISING THE SAME

(75) Inventors: Seiichi Arakawa, Yamaguchi (JP); Tadashi Ogawa, Yamaguchi (JP)

(73) Assignee: Ube Industries, Ltd., Yamaguchi (JP)

( * ) Notice: Subject to any disclaimer, the term of this patent is extended or adjusted under 35 U.S.C. 154(b) by 326 days.

(21) Appl. No.: 10/690,899

(22) Filed: Oct. 22, 2003

(65) Prior Publication Data

US 2004/0082703 A1   Apr. 29, 2004

(30) Foreign Application Priority Data

Oct. 24, 2002   (JP)   ............ P.2002-309242

(51) Int. Cl.
*C08K 3/40* (2006.01)
*C08F 283/00* (2006.01)

(52) U.S. Cl. .............. 524/494; 524/538; 525/432

(58) Field of Classification Search ........... 524/494, 524/538; 525/432
See application file for complete search history.

(56) References Cited

U.S. PATENT DOCUMENTS

| | | | | |
|---|---|---|---|---|
| 4,981,920 A | * | 1/1991 | Terashima et al. | 525/397 |
| 5,032,635 A | * | 7/1991 | Avakian et al. | 524/262 |
| 5,250,604 A | * | 10/1993 | Moriwaki et al. | 524/494 |
| 5,306,754 A | * | 4/1994 | Yamamoto et al. | 524/289 |
| 5,492,980 A | * | 2/1996 | Moriwaki | 525/429 |
| 5,795,931 A | * | 8/1998 | Katayama et al. | 524/494 |
| 2004/0259996 A1 | * | 12/2004 | Stoppelmann et al. | 524/430 |
| 2005/0058820 A1 | * | 3/2005 | Kitano et al. | 428/297.4 |
| 2005/0234180 A1 | * | 10/2005 | Ono et al. | 524/451 |

FOREIGN PATENT DOCUMENTS

| | | | |
|---|---|---|---|
| JP | 53006355 A | * | 1/1978 |
| JP | 57080448 A | * | 5/1982 |
| JP | 57-212252 | | 12/1982 |
| JP | 57212252 A | | 12/1982 |
| JP | 58-53950 | | 3/1983 |
| JP | 02245058 A | | 9/1990 |
| JP | 2002-114905 | | 4/2002 |
| JP | 2002-114905 A | | 4/2002 |
| JP | 2003083423 A | * | 3/2003 |
| WO | WO 95/20630 A1 | | 8/1995 |

OTHER PUBLICATIONS

JPO Machine Translation of JP 2003083423 A and JP 2002114905.*
JPO abstracts for JP 57080448 A and JP 2003083423 A.*
Derwent abstract for JP 53006355 A.*
Translation of JP 57-212252.*
Translation of JP 58-53950.*
Machine-Assisted Translation of JP 2002-114905.*
Translation of JP 57-080448.*

* cited by examiner

*Primary Examiner*—Vasu Jagannathan
*Assistant Examiner*—Sandra Poulos
(74) *Attorney, Agent, or Firm*—Akin Gump Strauss Hauer & Feld, LLP

(57) ABSTRACT

A polyamide resin composition for part of an engine cooling water system contains 100 parts by weight of a polyamide resin made of (A) from 50 to 98% by weight of nylon 66, (B) from 1 to 30% by weight of an aromatic polyamide resin, and (C) from 1 to 20% by weight of nylon 12; and (D) from 5 to 150 parts by weight of an inorganic filler, with the total content of nylon 66, the aromatic polyamide resin and nylon 12 being 100% by weight.

6 Claims, No Drawings

POLYAMIDE RESIN COMPOSITION FOR PART OF ENGINE COOLING WATER SYSTEM AND PART COMPRISING THE SAME

FIELD OF THE INVENTION

The present invention relates to a polyamide resin composition for part of an engine cooling water system that is excellent in resistance to calcium chloride, resistant to antifreeze, low water absorption, product appearance, welding property, and weld line strength. More specifically, the invention relates to a polyamide resin composition for part of an engine cooling water system that is excellent in resistance to calcium chloride, resistant to antifreeze, low water absorption, product appearance, welding property, and weld line strength and which is suitably used for utilities to be used in so-called engine parts under special temperature and humidity conditions of use, especially engine parts to be used under contact with cooling water within an engine room, such as radiator tank parts and water pump parts.

BACKGROUND OF THE INVENTION

Polyamide resins represented by nylon 6 and nylon 66 have excellent characteristics as engineering plastics and are widely used in various industrial fields such as automotive and electric and electronic fields.

In recent years, in automobile parts, especially resin-made parts to be used within an engine room, following high performance and high output of engines, the use environment becomes severe such that the temperature of engine cooling water increases and that the temperature within the engine room increases. Also, in the cold district, a large amount of a road-antifreezing agent is sprayed as a snow-melting agent, and engine parts are exposed to such chemicals. Now, a request for materials capable of keeping functions such as high strength and dimensional stability even in such a severe use environment is very raised.

However, in generalizably used nylon 6 and nylon 66, in particular, road-antifreezing agents made of a metal salt such as calcium chloride and zinc chloride act to the cycle of drying and wetting as repeated by water absorption by contact with engine cooling water and an increase in temperature within the engine room, resulting in a problem that stress cracking is liable to occur.

Then, as a method of improving the resistance to calcium chloride of nylon 6 and nylon 66, it is proposed to compound nylon 6 or nylon 66 with a polyamide resin having excellent resistance to calcium chloride such as nylon 12 (see, for example, JP-A-57-212252 (The term "JP-A" as used herein means an "unexamined published Japanese patent application".)). However, under the foregoing severe use environment, the resistance to calcium chloride is not sufficiently improved, and nylon 6 or nylon 66 does not substantially have an affinity with nylon 12, resulting in a problem that the weld line strength becomes worse.

Also, there is proposed a method of improving the resistance to calcium chloride by compounding nylon 6 or nylon 66 with a high-heat-resistant copolyamide resin containing an aromatic component such as a terephthalic acid unit and an isophthalic acid unit (see, for example, JP-A-58-53950 and JP-A-2002-114905). However, in order to improve the resistance to calcium chloride, though it is necessary to compound a large amount (30% by weight or more) of the foregoing high-heat-resistant copolyamide resin, since the foregoing high-heat-resistant copolyamide resin is amorphous, the viscosity becomes high, resulting in a problem that the fluidity becomes worse to deteriorate the appearance of molded articles.

SUMMARY OF THE INVENTION

An object of the invention is to provide a polyamide resin composition that is low in reduction of material characteristics even in the environment of contacting with high-temperature engine cooling water and within a high-temperature engine room and is excellent in resistance to calcium chloride, resistant to antifreeze, low water absorption, product appearance, welding property, and weld line strength, and which is suitably used especially for utilities to be used in parts to be used under contact with cooling water within an automobile engine room, such as radiator tank parts and water pump parts.

For the sake of solving this problem, the present inventors made extensive and intensive investigations. As a result, it has been found that by compounding nylon 66 with specific amounts of an aromatic polyamide resin and nylon 12, not only the defects caused in the case where the aromatic polyamide resin or nylon 12 is singly compounded in nylon 66 can be solved, but also, low water absorption and resistance to antifreeze can be greatly improved due to the effect to be brought by the combination, leading to accomplishment of the invention.

Specifically, the invention relates to a polyamide resin composition for part of engine cooling water system, comprising 100 parts by weight of a polyamide resin comprising (A) from 50 to 98% by weight of nylon 66, (B) from 1 to 30% by weight of an aromatic polyamide resin, and (C) from 1 to 20% by weight of nylon 12; and (D) from 5 to 150 parts by weight of an inorganic filler, with the total content of nylon 66, the aromatic polyamide resin and nylon 12 being 100% by weight.

DETAILED DESCRIPTION OF THE INVENTION

The invention will be hereunder described in detail.

The nylon 66 (A) that is used in the invention is not particularly limited with respect to the degree of polymerization but preferably has a relative viscosity, as measured at 25° C. by dissolving 1 g of the polymer in 100 ml of 96% concentrated sulfuric acid, from 2.0 to 5.0, more preferably from 2.1 to 4.5, and particularly preferably from 2.2 to 3.5. In the case where the relative viscosity is higher than the upper limit of the foregoing range, processability is remarkably deteriorated, whereas in the case where it is lower than the lower limit of the range, the mechanical strength is lowered, and hence, such is not preferable. Also, the nylon 66 as referred to herein includes copolymers containing a small amount (for example, not more than 10% by weight based on the total weight of the copolymer) of other polyamide structural units.

The aromatic polyamide resin (B) that is used in the invention is an aromatic polyamide resin containing at least one aromatic monomer component, and examples include copolyamides comprising an equimolar salt of an aliphatic diamine and an aromatic dicarboxylic acid, or an equimolar salt of an aromatic diamine and an aliphatic dicarboxylic acid, or furthermore an equimolar salt of an aliphatic diamine and an aliphatic dicarboxylic acid, and/or an aliphatic polyamide forming monomer.

Examples of aliphatic diamines include aliphatic diamines having from 4 to 12 carbon atoms such as tetramethylenedimaine, hexamethylenediamine, octamethylenediamine, nonamethylenediamine, undecamethylenediamine, and dodecamethylenediamine.

Examples of aromatic dicarboxylic acids include terephthalic acid, isophthalic acid, and naphthalenedicarboxylic acid.

Examples of aromatic diamines include M-xylylenediamine and p-xylylenediamine.

Examples of aliphatic dicarboxylic acids include aliphatic dicarboxylic acids having from 6 to 12 carbon atoms such as adipic acid, heptanedicarboxylic acid, octanedicarboxylic acid, nonanedicarboxylic acid, undecanedicarboxylic acid, and dodecanedicarboxylic acid.

Examples of aliphatic polyamide forming monomers include aminocarboxylic acids having from 6 to 12 carbon atoms and lactams having from 6 to 12 carbon atoms such as 6-aminocaproic acid, 7-aminoheptanoic acid, 11-aminoundecanoic acid, 12-aminododecanoic acid, α-pyrrolidone, ε-caprolactam, laurolactam, and ε-enantholactam, with 6-aminocaproic acid, 12-aminododecanoic acid, ε-caprolactam, and laurolactam being preferable. The aliphatic polyamide forming monomer can be used singly or in admixture of two or more thereof.

As the aromatic polyamide resin (B) that is used in the invention, preferable are amorphous partial aromatic copolyamide resins containing at least two aromatic monomer components. As the amorphous partial aromatic copolyamide resin, preferable are amorphous polyamides having a glass transition temperature, as determined by a peak temperature of loss elastic modulus in absolute dry condition obtained by measurement of dynamic viscoelasticity, of 100° C. or higher.

The term "amorphous" as referred to herein means that the crystal melting heat as measured by a differential scanning calorimeter (DSC) is not higher than 1 cal/g.

As the amorphous partial aromatic copolyamide resin, preferable are ones comprising from 40 to 95% by mole of a terephthalic acid component unit and from 5 to 60% by mole of an isophthalic acid component unit and an aliphatic diamine, with the total content of the tereplithalic acid component unit and the isophthalic acid component unit being 100% by mole. Preferred examples of the combination include an equimolar salt of hexamethylenediamine and terephthalic acid and an equimolar salt of hexamethylenediamine and isophthalic acid.

Also, the amorphous partial aromatic copolyamide resin is preferably one comprising from 99 to 60% by weight of a polyamide forming component comprising an aliphatic diamine and isophthalic acid and terephthalic acid and from 1 to 40% by weight of an aliphatic polyamide component, with the total content of the polyamide forming component and the aliphatic polyamide component being 100% by weight.

The nylon 12 (C) that is used in the invention is not particularly limited with respect to the degree of polymerization but preferably has a relative viscosity of from 1.8 to 5.0. Also, the nylon 12 as referred to herein includes copolymers containing a small amount (for example, not more than 10% by weight based on the total weight of the copolymer) of other polyamide structural units.

In the invention, the mixing ratio of the nylon 66 (A), the aromatic polyamide resin (B) and the nylon 12 (C) falls within the range such that the amount of the nylon 66 (A) is from 50 to 98% by weight, and preferably from 60 to 85% by weight, the amount of the aromatic polyamide resin (B) is from 1 to 30% by weight, and preferably from 10 to 25% by weight, and the nylon 12 (C) is from 1 to 20% by weight, and preferably from 5 to 15% by weight, with the total content of nylon 66, the aromatic polyamide resin and nylon 12 being 100% by weight.

When the amount of the aromatic polyamide resin (B) to be used is higher than the upper limit of the foregoing range, the fluidity within a mold becomes worse, and moldability and appearance are deteriorated, and hence, such is not preferable. On the other hand, when it is less that the lower limit of the foregoing range, the improving effects of resistance to calcium chloride, welding property and weld line strength are low so that the object of the invention cannot be attained.

When the amount of the nylon 12 (C) is higher than the upper limit of the foregoing range, the weld line strength is lowered, and hence, such is not preferable. On the other hand, when it is less than the lower limit of the foregoing range, the improving effects of low water absorption and appearance are low so that the object of the invention cannot be attained.

As the inorganic filler (D) that is used in the invention, fibrous or non-fibrous inorganic fillers can be enumerated. Specific examples include fibrous fillers such as glass fibers, carbon fibers, potassium titanate whiskers, zinc oxide whiskers, aluminum borate whiskers, aramid fibers, alumina fibers, silicon carbide fibers, ceramic fibers, asbestos fibers, gypsum fibers, and metallic fibers; and non-fibrous fillers such as silicates (such as wollastonite, zeolite, sericite, kaolin, mica, clay, pyrophyllite, bentonite, montmorillonite, asbestos, talc, and aluminosilicate), metal oxides (such as alumina, silicon oxide, magnesium oxide, zirconium oxide, titanium oxide, and iron oxide), carbonates (such as calcium carbonate, magnesium carbonate, and dolomite), sulfates (such as calcium sulfate and barium sulfate), hydroxides (such as magnesium hydroxide, calcium hydroxide, and aluminum hydroxide), glass beads, ceramic beads, boron nitride, silicon carbide, and silica. These inorganic fillers may be in a hollow shape. Moreover, a combination of two or more of these inorganic fillers may be employed. Also, it is preferable in the meaning of obtaining more excellent mechanical strength to preliminarily treat such an inorganic filler with a coupling agent such as isocyanate based compounds, acrylic compounds, organic silane based compounds, organic titanate based compounds, organic borane based compounds, and epoxy compounds.

In the invention, among these inorganic fillers, glass fibers and talc are preferable, with glass fibers being more preferable.

The fibrous filler has a fiber diameter of from 0.01 to 20 μm, and preferably from 0.03 to 15 μm and a fiber cut length of from 0.5 to 10 mm, and preferably from 0.7 to 5 mm.

The amount of the inorganic filler (D) that is used in the invention is from 5 to 150 parts by weight, and preferably from 20 to 100 parts by weight based on 100 parts by weight of the resulting polyamide resin. When the amount of the inorganic filler (D) is less than 5 parts by weight, the mechanical strength of the polyamide resin is not sufficiently satisfactory. On the other hand, when it is more than 150 parts by weight, though the mechanical strength is sufficiently satisfactory, the moldability and surface state become worse, and hence, such is not preferable.

In the resin composition of the invention, function-imparting agents such as heat-resisting agents, weather-resisting agents, crystal nucleating agents, crystallization promoters, releasing agents, lubricating agents, antistatic agents, flame retardants, flame retardant aid agents, and coloring agent can be used within the range where the object of the invention is not hindered.

More specifically, examples of heat-resisting agents include hindered phenols, phosphites, thioethers, and copper halides. These can be used singly or in admixture.

Examples of weather-resisting agents include hindered amines and salicilates. These can be used singly or in admixture.

Examples of crystal nucleating agents include inorganic fillers such as talc and clay and organic crystal nucleating agents such as fatty acid metal salts. These can be used singly or in admixture.

Examples of crystallization promoters include low-molecular weight polyamides, higher fatty acids, higher fatty acid esters, and higher aliphatic alcohols. These can be used singly or in admixture.

Examples of releasing agents include fatty acid metal salts, fatty acid amides, and various waxes. These can be used singly or in admixture.

Examples of antistatic agents include aliphatic alcohols, aliphatic alcohol esters, and higher fatty acid esters. These can be used singly or in admixture.

Examples of flame retardants include metal hydroxides such as magnesium hydroxide, phosphorus, ammonium phosphate, ammonium polyphosphate, melamine cyanurate, ethylene-dimelamine cyanurate, potassium nitrate, brominated expoxy compounds, brominated polycarbonate compounds, brominated polystyrene compounds, tetrabromobenzyl polyacrylate, tribromophenol polycondensate, polybromobiphenyl ethers, and chlorine based flame retardants. These can be used singly or in admixture.

In the resin composition of the invention, other thermoplastic resins can be added within the range where the object of the invention is not hindered. Examples of thermoplastic resins to be used in combination include generalized resin materials (such as polyethylene, polypropylene, polystyrene, ABS resins, AS resins, and acrylic resins), aliphatic polyamide resins (such as nylon 6 and nylon 11), polycarbonates, polyphenylene oxide, polyethylene terephthalate, polybutylene terephthalate, polyphenylene sulfide, and other highly heat-resistant resins. Especially, in the case where polyethylene or polypropylene is used in combination, it is desired to use ones modified with maleic anhydride or a glycidyl group-containing monomer.

The resin composition of the invention may be formed by blending respective resin pellets and melt mixing at a stage of obtaining the final product, or may be previously melt mixed by a single screw or twin-screw extruder, a Banbury mixer, etc. and then provided for molding. Thus, the resin composition of the invention can be used for extrusion molding, blow molding, or injection molding.

The polyamide resin composition of the invention is used in a part of engine cooling water system. Examples of the part of engine cooling water system as referred to therein include parts to be used under contact with cooling water within an engine room such as radiator tank parts such as radiator tank tops and bases, a reserve tank of cooling liquid, a water pipe, a water pump housing, a water pump impeller, and valves, and the polyamide resin composition of the invention is suitably used for automobiles.

While the invention is used for parts of engine cooling water system, especially parts of automobile engine cooling water system, it can be used without a hindrance for other members for which the same functions are required, such as warm water pipes for floor heating, water spray pipes for road snow-melting, and other resin parts.

The invention will be specifically described below with reference to the following Examples and Comparative Examples, but it should not be construed that the invention is limited thereto.

Incidentally, the measurement of physical properties of molded articles of the Examples and Comparative Examples was carried out in the following manner.

(Evaluation of Physical Properties)

(Evaluation of Mechanical Characteristics)

The evaluation was carried out under the following respective item conditions. The evaluation was all carried out in drying condition.

(1) Tensile Strength and Elongation:

A No. 1 specimen having a thickness of 3.2 mm was used and measured at a tensile rate of 10 mm/min according to ASTM D638.

(2) Flexural Strength and Flexural Modulus:

A strip specimen having a thickness of 6.4 mm was used and subjected to three-point bending test according to ASTM D790.

(3) Impact Strength:

A strip specimen having a thickness of 12.7 mm was used and notched in the post processing, and then evaluated using an Izod impact tester according to ASTM D256.

(Evaluation of Resistance to Calcium Chloride)

A No.1 specimen of ASTM was immersed in water at 80° C. for 8 hours as the pre-treatment. Next, the resulting specimen was subjected to humidification treatment in a thermo-hygrostat at 80° C. and 85% RH for one hour. Thereafter, a saturated calcium chloride aqueous solution was coated on the specimen, which was then heat treated in an oven at 100° C. for one hour. The humidification treatment and the heat treatment were defined as one cycle, and this cycle was repeated up to 30 cycles. The number of cycles at which the specimen was cracked was defined as an index.

(Evaluation of Resistant to Antifreeze)

A Dynstat impact strength of a specimen having a size of 10×15×3.2 mm was measured at the initial stage and after the treatment in a mixture of an automobile antifreeze and water (1/1) at 120° C. for 1000 hours according to the BS1330 standards, and its retention was defined as an index of resistance to antifreeze.

(Weld Line Strength)

A No. 1 specimen of ASTM having a thickness of 3.2 mm was used and measured at a tensile rate of 10 mm/min according to ASTM D638. A specimen was injection molded by filling a molten resin in the same flow rate from the both ends of the No. 1 specimen of ASTM such that a weld portion was caused in the center of the specimen.

(Evaluation of Water Absorption)

A specimen having a size of 30×100×3 mm was used and immersed in warm water at 50° C. for 144 hours, and its dimensional change rate was defined as an index.

(Evaluation of Appearance)

A surface roughness of a specimen was measured using a surface roughness analyzer (manufactured by KOSAKA Laboratory).

EXAMPLE 1

72.5 parts by weight of (A) polyamide 66 (2020B manufactured by Ube Industries, Ltd.), 20 parts by weight of (B) polyamide 6I/6T (Grivory G21 manufactured by EMS-CHEMIE), and 7.5 parts by weight of (C) polyamide 12 (3014U manufactured by Ube Industries, Ltd.) were uniformly mixed in advance, and the mixture was kneaded in a 44-mmΦ vented twin-screw extruder set up at a barrel temperature of 285° C. During kneading the polyamide resin, glass fibers (fiber diameter: 11 μm, fiber cut length: 3 mm) were fed from the middle of the extruder such that the amount of the glass fibers was 55 parts by weight based on 100 parts by weight of the polyamide resin, to prepare pellets of the desired polyamide resin composition. Next, the resulting pellets were dried under a reduced pressure of 10 torr at 110° C. for 24 hours and then injection molded at a cylinder temperature of 285° C. and at a mold temperature of 80° C. to produce various specimens, which were then evaluated for the physical properties. The results obtained are shown in Table 1.

EXAMPLES 2 TO 3

Polyamide resin compositions were prepared in the same manner as in Example 1, except for changing the charge amounts of (A) polyamide 66, (B) polyamide 6I/6T and (C) polyamide 12 as shown in Table 1, and then evaluated for the physical properties. The results obtained are shown in Table 1.

COMPARATIVE EXAMPLE 1

A polyamide resin composition was prepared according to Example 1, except for not using (B) polyamide 6I/6T and (C) polyamide 12, and then evaluated for the physical properties. The results obtained are shown in Table 1.

COMPARATIVE EXAMPLES 2 TO 3

Polyamide resin compositions were prepared in the same manner as in Example 1, except for not using (C) polyamide 12 and changing the charge amounts of (A) polyamide 66 and (B) polyamide 6I/6T as shown in Table 1, and then evaluated for the physical properties. The results obtained are shown in Table 1.

COMPARATIVE EXAMPLE 4

A polyamide resin composition was prepared in the same manner as in Example 1, except for not using (B) polyamide 6I/6T and changing the charge amounts of (A) polyamide 66 and (C) polyamide 12 as shown in Table 1, and then evaluated for the physical properties. The results obtained are shown in Table 1.

TABLE 1

|  |  | Example 1 | Example 2 | Example 3 | Comparative Example 1 | Comparative Example 2 | Comparative Example 3 | Comparative Example 4 |
| --- | --- | --- | --- | --- | --- | --- | --- | --- |
| PA66 | Weight part | 72.5 | 68 | 75 | 100 | 80 | 70 | 80 |
| PA6I/6T | Weight part | 20 | 20 | 15 | — | 20 | 30 | — |
| PA12 | Weight part | 7.5 | 12 | 10 | — | — | — | 20 |
| Glass fibers | Weight part | 55 | 55 | 55 | 55 | 55 | 55 | 55 |
| Tensile strength | MPa | 196 | 190 | 192 | 181 | 210 | 207 | 176 |
| Elongation | % | 4 | 4 | 4 | 4 | 4 | 4 | 4 |
| Flexural strength | MPa | 267 | 260 | 263 | 254 | 290 | 286 | 240 |
| Flexural modulus | GPa | 9.3 | 9.0 | 9.0 | 8.0 | 9.5 | 9.3 | 8.8 |
| Impact strength | J/m$^2$ | 80 | 79 | 80 | 80 | 80 | 80 | 74 |
| Resistance to calcium chloride | Cycle | Not cracked | Not cracked | Not cracked | 4 | 25 | Not cracked | Not cracked |
| Resistance to antifreeze | % | 83 | 88 | 82 | 51 | 68 | 69 | 65 |
| Change in dimension by water absorption (flow/right angle) | % | 0.15/0.70 | 0.12/0.58 | 0.13/0.62 | 0.35/1.30 | 0.20/0.94 | 0.13/0.53 | 0.28/1.00 |
| Weld line strength | MPa | 92 | 90 | 90 | 102 | 97 | 95 | 81 |
| Appearance | μm | 2.2 | 2.0 | 2.0 | 2.8 | 2.6 | 6.3 | 1.9 |

The polyamide resin composition obtained in the invention is low in reduction of material characteristics even in the environment of contacting with high-temperature engine cooling water and within a high-temperature engine room and is excellent in resistance to calcium chloride, resistant to antifreeze, low water absorption, product appearance, welding property, and weld line strength, and is suitably used for parts of automobile engine cooling water system, especially for utilities to be used in parts to be used under contact with cooling water within an automobile engine room, such as radiator tank parts such as radiator tank tops and bases, a reserve tank of cooling liquid, a water pipe, a water pump housing, a water pump impeller, and water pump parts such as valves.

While the invention has been described in detail and with reference to specific embodiments thereof, it will be apparent to one skilled in the art that various changes and modifications can be made therein without departing from the spirit and scope thereof.

What is claimed is:

1. A polyamide resin composition for part of an engine cooling water system, comprising 100 parts by weight of a polyamide resin comprising (A) from 60 to 98% by weight of nylon 66, (B) from 1 to 25% by weight of an aromatic polyamide resin, and (C) from 1 to 15% by weight of nylon 12, wherein the percent by weight amounts are based on the total combined weight of components (A), (B) and (C); and (D) from 5 to 150 parts by weight of an inorganic filler.

2. The polyamide resin composition for part of an engine cooling water system according to claim 1, wherein the aromatic polyamide resin (B) comprises an amorphous copolyamide resin having from 40 to 95% by mole of a terephthalic acid component unit and from 5 to 60% by mole of an isophthalic acid component unit and an aliphatic diamine, with the total content of the terephthalic acid component unit and the isophthalic acid component unit being 100% by mole based on the amorphous copolyamide resin.

3. The polyamide resin composition for part of an engine cooling water system according to claim 1, wherein the aromatic polyamide resin (B) comprises an amorphous copolyamide resin having from 99 to 60% by weight of a polyamide forming component comprising an aliphatic diamine and isophthalic acid and terephthalic acid and from 1 to 40% by weight of an aliphatic polyamide component, with the total content of the polyamide forming component and the aliphatic polyamide component being 100% by weight based on the amorphous copolyamide resin.

4. The polyamide resin composition for part of an engine cooling water system according to claim 1, wherein the inorganic filler (D) is glass fibers.

5. The polyamide resin composition for part of an engine cooling water system according to claim 1, wherein the polyamide resin composition has a resistance to antifreeze index of 82 to 88%.

6. A part of an engine cooling water system comprising the polyamide resin composition according to claim 1.

* * * * *